Jan. 31, 1967  E. S. BOYD ETAL  3,301,993
WELDED JOINT AND APPARATUS AND METHOD FOR MAKING SAME
Filed May 21, 1962  9 Sheets-Sheet 1

INVENTORS
EDWARD S. BOYD
VENE L. DARBY
EDWIN E. HATTER
BY
ATTORNEY

INVENTORS
EDWARD S. BOYD
VENE L. DARBY
EDWIN E. HATTER
BY
ATTORNEY

INVENTORS
EDWARD S. BOYD
VENE L. DARBY
EDWIN E. HATTER
ATTORNEY

Jan. 31, 1967      E. S. BOYD ETAL      3,301,993
WELDED JOINT AND APPARATUS AND METHOD FOR MAKING SAME
Filed May 21, 1962                              9 Sheets-Sheet 8

INVENTORS
EDWARD S. BOYD
VENE L. DARBY
EDWIN E. HATTER
BY
ATTORNEY

United States Patent Office 3,301,993
Patented Jan. 31, 1967

3,301,993
WELDED JOINT AND APPARATUS AND METHOD FOR MAKING SAME
Edward S. Boyd, Anaheim, Vene L. Darby, Redondo Beach, and Edwin E. Hatter, Torrance, Calif., assignors to North American Aviation, Inc.
Filed May 21, 1962, Ser. No. 196,238
31 Claims. (Cl. 219—117)

This invention concerns an improved type welded joint as well as method and apparatus for forming such joints. More particularly, this invention concerns precision welding by an electron beam to form a high strength joint between workpieces involving thin-walled components having extreme sensitivity to the application of welding heat. The invention also includes portable and lightweight chamber means for isolating a workpiece surface or a portion thereof from surrounding atmosphere whereby a vacuum may be created in such chamber. More particularly, the invention contemplates improved chamber means of the stated type for use in welding with electronic beam guns wherein a relatively high vacuum environment is essential for successful operation of the gun.

Although the invention is of wide applicability in combining various performance features in high vacuum chambers not heretofore achieved, it will be described for the sake of illustration in connection with electron beam welding of lightweight steel panels of the type modernly used for the external surfaces of supersonic aircraft and space vehicles. It will be understood that the scope of the inventive concept is in no sense limited by any of the specific details used to explain the invention, except as determined by reference to the accompanying claims.

In the fabrication of supersonic aerial vehicles, missiles and the like, panels of the type referred to above are separately formed in large sections and then welded together along continuous high-strength seams. The stated sections are typically of sandwich type construction having a slab of low density core material with a relatively high density face sheet affixed to the core on either side thereof. Due to extreme thinness of the panel components such as .006 inch face sheet thickness, for example, and .001 inch wall thickness in core material of honeycomb foil type, the stated sections are highly sensitive to the application of welding heat in view of their low mass. Thus, thermal changes such as expansion and contraction of the weld zone during and after the welding operation, respectively, with consequent distortion and internal stress effects, are especially acute. Avoidance of non-uniform residual stresses and other distortion factors in the problem situation described above is crucially important, since accurate fitting of large panel sections along the entire length of their confronting edges is necessary to form continuous, high-strength weld seams.

The welding problem discussed herein is considerably aggravated by the use of advance alloys such as chrome-nickel stainless steel in the stated panels, requiring high welding heat and commensurately deep penetration of the same in the materials to be joined to effect fusion thereof. Illustrative of the stated materials is the alloy commonly designated PH15-7Mo, comprised of the following components:

| | | |
|---|---|---|
| Carbon | percent maximum | .09 |
| Manganese | do | 1.00 |
| Phosphorous | do | .04 |
| Sulphur | do | .03 |
| Silicon | do | 1.00 |
| Chromium | percent | 14.00 to 16.00 |
| Nickel | do | 6.5 to 7.5 |
| Molybdenum | do | 2.00 to 3.00 |
| Aluminum | do | .75 to 1.5 |
| Iron | | Balance |

While the stated precipitation hardenable alloys including PH15-7Mo provide great strength at elevated temperatures, such materials are characterized by severe shrinkage during the cooling period following welding of the workpiece material. Thus, in the joinder of sandwich type panels such as described above, elongated ruptures and material failures in the weld area are frequently encountered after welding by conventional means, principally due to the fact that shrinkage in the zone of fusion and the area adjacent thereto causes high residual stress in consequence of the restraining force exerted by the base metal surrounding the weld area. The area containing the base metal which undergoes significant metallurgical changes due to heating effects of welding, and the strength of which is seriously affected therefrom, is called the heat affected zone and normally comprises a strip on either side of the weld seam and proximate thereto. The weakening and distortion effects of such shrinkage in thin sections of materials such as designated above are normally both unavoidable and acute.

Of further significance in the welding problem described above is the fact that panels of the stated type are fabricated by brazing the metallic core material to the upper and lower metallic face sheets whereby the strength of the panel depends upon continuous and uniform adherence of brazing alloy fillets where the honeycomb cell walls contact each of the face sheets. Since the brazing alloy used in the stated joints necessarily has a melting temperature or liquidus below the melting temperature of the base metal in the core and face sheets, the application of welding heat to fuse together two panels by conventional means usually melts the brazing alloy fillets in an area determined by the welding path and having a width coinciding generally with the so-called heat affected zone.

In the joinder of sandwich type steel panels such as discussed above, the size and arrangement of weld seams formed between confronting edges of individual panel components has a significant effect on the results of shrinkage at the location of each weld. Attachment of two panels of the stated type to form a continuous workpiece involves welding the upper and lower face sheets of one panel to the upper and lower face sheets of the other panel, respectively. When access to both sides of the panels is not possible, or the distribution of heat in the base metal during welding is not uniform in rate or pattern of distribution, differential stresses having a cumulative and highly deleterious effect on the strength and dimensional accuracy of the finished workpiece invariably result. Due to the extreme rapidity and localized heat concentration identified with electron beam welding, the stated method has been found to produce strong, reliable and distortion-free joints in workpieces of the type described above, particularly when differential stresses due to shrinkage are avoided by simultaneous welding of both upper and lower face sheets simultaneously. However, electron beam welding must be done in a vacuum so great that it is normally achieved only with exotic and highly refined laboratory equipment not adapted for mass-production use. Moreover, welding of the type discussed above involves relative movement between the heat source and the workpiece and also involves workpieces of relatively large size wherein the weld seam may be over fifty feet in length. Thus, conventional welding methods involving the use of stationary chambers in which both the heat source and the workpiece are entirely contained or enclosed are incapable of achieving the versatility, portability, accuracy or economy required in apparatus for use in mass-production items such as thin-walled panels of advanced alloy illustratively described above.

Accordingly, it is a general object of the invention in this case to provide an improved weld joint between relatively thin members.

It is also an object in this case to provide an improved high strength welded connection between adjacent sections of metallic lightweight sandwich type panels.

It is also an object of this invention to provide an improved welded connection in a workpiece involving a plurality of weld seams wherein the workpiece material has a particularly propensity to expand and to shrink upon the application of heat or upon cooling the same, respectively.

It is a further object in this case to provide improved apparatus including a vacuum chamber for forming welded connections of great length, exceeding the length of such chamber.

It is a further object of this invention to provide portable chamber means for producing a high vacuum in a localized area incorporating means for moving an electron beam relative to the welded workpiece.

Other objects and advantages will become apparent upon a close reading of the following detailed description of the inventive concept, reference being had to the accompanying drawings wherein:

Figure 1:
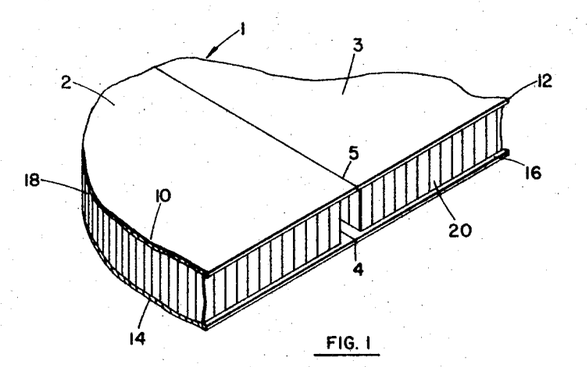
FIGURE 1 shows a general perspective view of a joint formed between two individual panel sections according to the inventive teachings disclosed herein.

Referring to FIGURE 1, a welded joint incorporating the inventive principles disclosed herein as applied to joinder of two lightweight sandwich type panels may be seen. The panel connection illustrated represents a new approach to the problem of securing such panels to each other or to other structure having flange or sheet-like portions to which both face sheets of the panel must be joined by strong and secure weldments. Thus, a single unitary panel or workpiece 1 comprising two component panel sections 2 and 3 joined to each other along two weldments 4 and 5 formed between the confronting lower and upper face sheets, respectively, may be seen from FIGURE 1. Workpiece component 2 comprises upper and lower face sheets 10 and 14, respectively, joined to a lightweight core section 18 of relatively low density material such as honeycomb material, while workpiece component 3 is of identical construction having face sheets 12 and 16 with core material 20 therebetween. Face sheets 10, 12, 14 and 16 may be of uniform thickness and are of greater density than core material 18 and 20.

Figure 3:
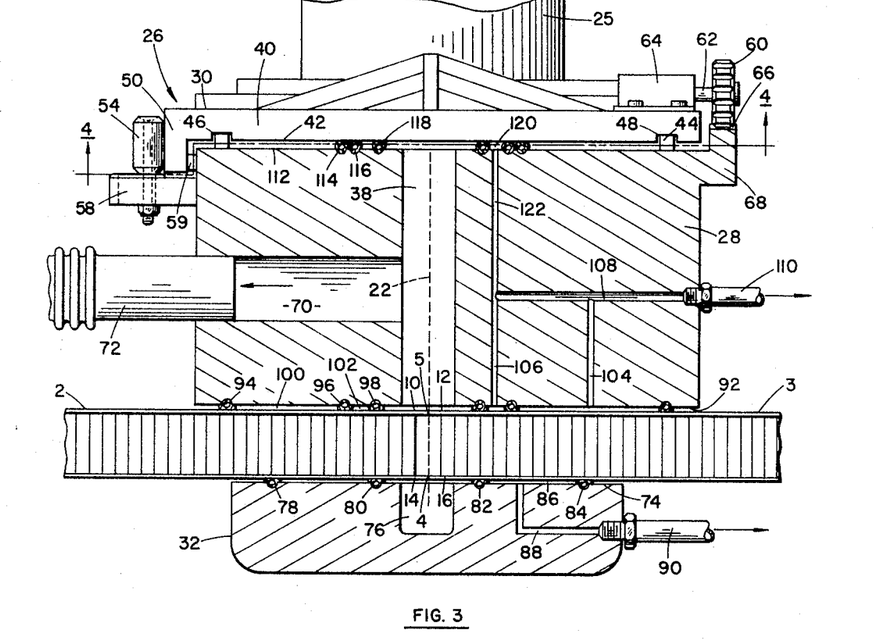
FIGURE 3 shows a cross-sectional view through a joint similar to the one shown in FIGURE 1 and through an illustrative embodiment of apparatus for forming the stated joint.

Referring to FIGURE 3 it may be seen that the novel method of forming workpiece 1 of FIGURE 1 involves initial preparation of the confronting panel edges to be joined by appropriate cutting so that flange-like structure formed by upper and lower face sheets 10 to 16 results. Lower face sheets 14 and 16 on panel components 2 and 3, respectively, are accurately cut to form abutting distal edges which may contact each other continuously throughout their entire length while upper face sheets 10 and 12, respectively, are accurately cut to form confronting distal edges in similarly continuous contact throughout their length. Upper and lower face sheets 10 to 16, while arranged in abutting contact as shown by FIGURE 3 are simultaneously welded to produce a seam or joint 5 and 4 between the confronting upper and lower face sheets, respectively. Seams 4 and 5 are produced by means of an electron beam indicated at 22 originating from a conventional source (not shown), the internal details of which do not form any part of the inventive concept disclosed and claimed herein, and which therefore need not be disclosed. The zone of fusion produced by an electron beam in workpieces of the type shown in FIGURE 1 and described above is extremely narrow, and its largest diametral dimension in transverse cross section is no greater than the face sheet thickness in sheets 10, 12, 14 and 16. This feature is distinctly advantageous in that the heat-affected zone is correspondingly narrow, thus avoiding the adverse effects of shrinkage as discussed in detail above.

Since an electron beam such as indicated in FIGURE 3 by reference numeral 22 may normally be produced only within a vacuum, and in welding seams 4 and 5 is required to move relative to workpiece 1 along a path corresponding to the common plane of abutment of confronting face sheets 10 to 16 as discussed above, the apparatus shown in FIGURE 3 incorporates means for producing the required vacuum and for permitting relative movement of beam 22 in respect of workpiece 1. The stated apparatus may be seen to include a portable chamber generally designated 26 in FIGURE 3 adapted to fit securely against the surface of workpiece 1 on one side thereof and in sealed relationship therewith. Chamber 26 may be seen to include an encompassing wall portion which forms a normally stationary and open ended generally rectangular main block or body portion 28. Chamber 26 is further provided with a linearly movable upper closure or lid portion 30 supported on the walls forming body portion 28. A stationary chamber 32 is secured against the surface of workpiece 1 and in sealing relationship therewith opposite the side thereof contacted by open ended main body portion 28.

Figure 2:
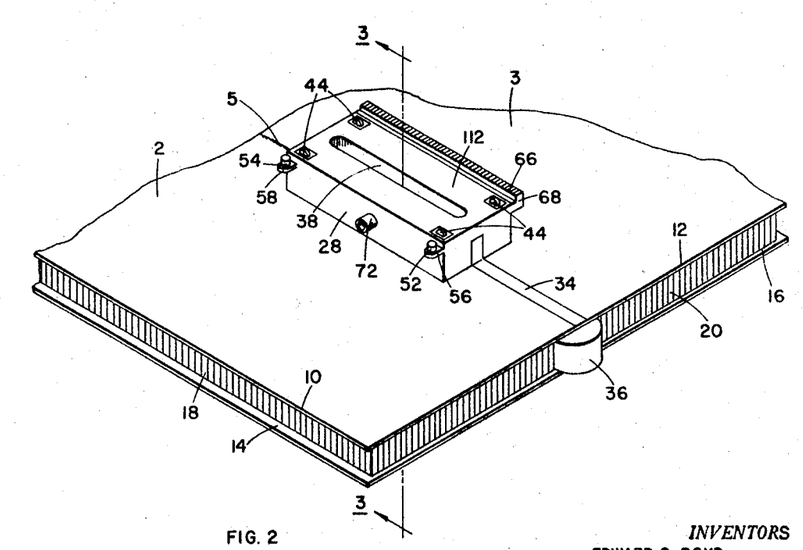
FIGURE 2 shows a perspective view of a portion of the apparatus of FIGURE 3 operatively related to a workpiece similar to that shown in FIGURES 1 and 3.
Figure 2A:
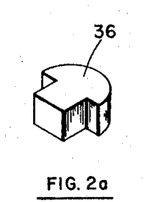
FIGURE 2a shows an isolated perspective view of a seal component used in forming the joint of FIGURE 1.

The operative relationship between chamber 26 and workpiece 1, as shown in FIGURE 2, for example, is established by mounting the open end of main body portion 28 in sealing contact with the workpiece surface and centered over the common plane of abutment of the confronting edges of face sheets 10 to 16. That portion of the seam formed by the stated abutting edges which has not been previously fused may be sealed by flexible non-porous tape such as plastic tape 34 shown by FIGURE 2, extending from body portion 28 to the terminal edge of workpiece 1 and functionally cooperative with suitable sealing means such as resilient plug 36 and with lower chamber 32 mounted on the workpiece undersurface whereby the entire area between panels 2 and 3 is isolated from the pressure of the surrounding atmosphere. Plug 36 is also shown in FIGURE 2a, and may be fabricated from silicone rubber and sized to fit snugly within the space defined by the abutting face sheet and core material on either side of the panel joint. With main body portion 28 centered over the line of contact between confronting face sheets 10 to 16 in the manner shown by FIGURES 2 and 3, aperture or tunnel 38 provided in body portion 28 is aligned over the stated line of contact.

Upper closure portion 30 comprises movable mounting means which is provided for source 24 whereby electron beam 22 originating from within housing 25 may travel through tunnel 38 and may be moved along a desired welding path to produce fusion of materials along the plane of abutment between confronting face sheets 10 to 16, inclusive. Accordingly, the length of tunnel 38 determines the maximum length of weld seam increment produced at each successive location of chamber 26 along the surface of workpiece 1. Thus, after beam 22 has traversed the entire length of tunnel 38 and has welded along the path defined by such traversing movement, the welding process is temporarily concluded until chamber 26 is removed from workpiece 1, repositioned and again secured to the workpiece in sealing relationship therewith at the next welding station whereby tunnel 38 will permit movement of beam 22 along a welding path slightly overlapping the previously completed weld seam, and the welding process is repeated whereby the seam is again advanced by an increment of length limited by the dimensions of tunnel 38. Chamber 32 is also moved from one welding station to the next and maintained in alignment with chamber 26, except where the nature of the workpiece does not require use of lower chamber 32 as in the case when seam 5 is welded after seam 4 has previously been completed.

Figure 4:
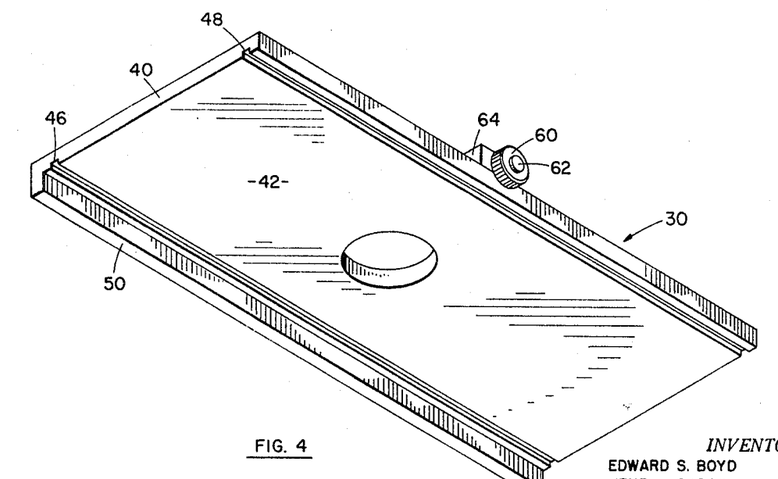
FIGURE 4 is an isolated perspective view of a portion of the apparatus shown in FIGURE 3.

The movable mounting means for the electron beam source mentioned above comprises linearly movable upper closure or lid portion 30 shown, for example, in FIGURES 3 and 4. Movable closure portion 30 includes a plate or base member 40 having a substantially planar surface 42 on one side thereof adapted to contact the surface of body portion 28 opposite from the side of portion 28, contacted by workpiece 1. Substantially planar surface 42 is in sliding contact with sealing means on the upper surface of body portion 28 whereby sealing contact between closure member 30 and body portion 28 is continuously maintained during movement of lid portion 30 relative to body portion 28 as described below. Bearing means are provided to support most of the weight of lid portion 30 on body portion 28 and may take the form of wheels or ball bearing members 44 aligned on either side of body portion 28 as shown, for example, in FIGURES 2 and 3. Ball bearing members 44 may be rotationally mounted on the upper surface of body portion 28 and are adapted to engage lid portion 30 along a pair of parallel grooves 46 and 48 situated in spaced relationship on substantially planar surface 42 as shown, for example, in FIGURE 4. Lateral support means to prevent lateral movement of lid portion 30 during traversing movement of portion 30 along the upper surface of body portion 28 is provided in the form of a downwardly depending flange 50 affixed to plate member 40 at one side thereof as shown in FIGURES 3 and 4. Flange 50 is operatively related to a pair of bearing members which may take the form of rollers 52 and 54 secured to body portion 28 at one side thereof by a pair of brackets 56 and 58, respectively, and to another pair of bearing members, one of which is shown at 59 in FIGURE 3, mounted generally the same as bearing members 44 except on an axis normal to the axes of members 44.

Suitable drive means are provided in the apparatus shown, for example, in FIGURE 3 for causing movement of lid portion 30 relative to body portion 28 and may take the form of externally mounted cable systems, lead screws or fluid operated pistons depending upon the size of apparatus, its operative relationship to the workpiece, and the rate or accuracy of movement desired for electron beam 22. In the preferred embodiment shown by FIGURE 3, the stated drive means comprises a rack and pinion arrangement whereby movement of lid portion 30 is produced by rotation of a pinion 60 on a shaft 62 driven by a motor 64 mounted on plate member 40. Pinion 60 is operatively engaged with a rack 66 formed on a support 68 integrally formed on or otherwise affixed to body portion 28.

Conventional means may be incorporated in the novel apparatus disclosed herein for creating a vacuum as required in tunnel 38 to permit emittance of an electron beam 22 from the source within housing 25 shown, for example, in FIGURE 3. The stated means may communicate with tunnel 38 through body portion 28 by suitable passages such as passage 70 and conduit connection 72 which may be connected to any of various known commercially available devices for creating a vacuum. For example, passage 70 and conduit 72 may be operatively related to a mechanical vacuum pump of the type taught by U.S. Patent No. 2,337,849 and a diffusion type vacuum device such as taught by U.S. Patent Nos. 2,572,449, 2,211,329 and 2,435,686, so that air within tunnel 38 may be evacuated initially by the mechanical pump and the residue may be evacuated by the diffusion device. In addition, suitable sealing means as required between the workpiece surfaces and the chamber portions in contact therewith and between lid portion 30 and body portion 28 are provided as shown, for example, by FIGURE 3 to maintain the vacuum in tunnel 38 during operation of the welding apparatus.

Figures 7, 8:
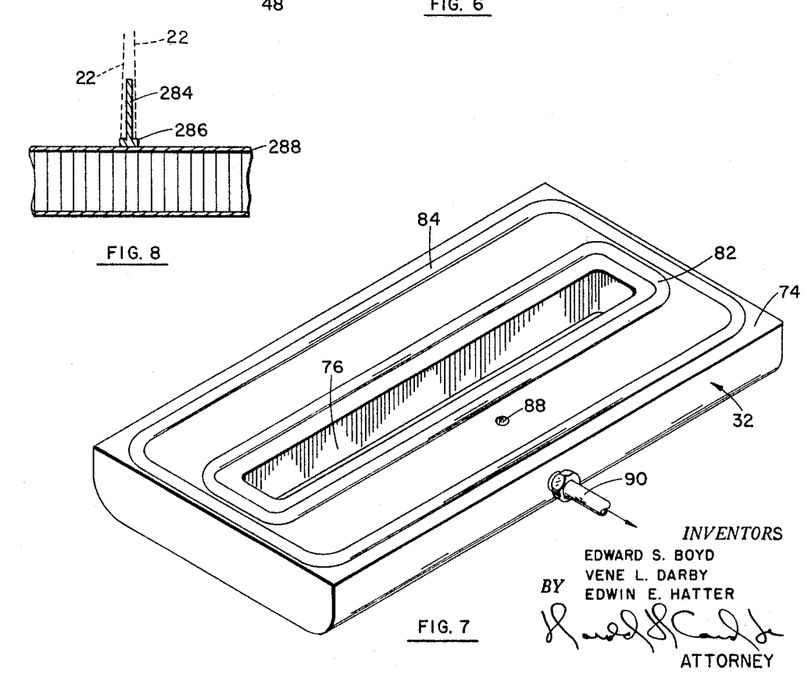
FIGURE 7 shows an isolated perspective view of a portion of the apparatus shown in FIGURE 3.
FIGURE 8 shows a cross-sectional view through a workpiece such as that shown in FIGURE 5.

Lower chamber 32 may be seen from FIGURES 3 and 7 to comprise a generally elongate member, the upper surface 74 of which may be substantially planar or otherwise contoured to match the planar or other contour of workpiece 1 contacted by surface 74. Member 32 is provided with a cavity 76 located generally along the center of the member and extending inwardly from surface 74. Cavity 76 is dimensioned and situated with respect to surface 74 to permit alignment of the cavity with tunnel 38 in body portion 28 on the opposite surface of workpiece 1. Surface 74 of member 32 is further provided with a plurality of grooves 78 and 80 concentrically located with respect to cavity 76 and generally semi-circular in cross-section as shown in FIGURE 3. Grooves 78 and 80 are adapted to receive a pair of annular tubes 82 and 84, respectively, of flexible materials such as surgical rubber or latex. As shown more particularly by FIGURE 3, for example, tubes 82 and 84 are operatively related to surface 74 whereby the lower half of each tube, when properly seated within grooves 78 and 80, results in the upper portion of each tube protruding above surface 74 and contacting the confronting surface of workpiece 1 when lower closure member 32 is assembled in operative relationship with the workpiece in preparation for welding. One or more passages communicating with space 88 between tubes 82 and 84 is provided as shown by passage 86 in FIGURE 3 whereby space 88 is communicated to suitable conduit means such as 90 for connection with a vacuum pump such as mentioned hereinabove.

Additional sealing means of the same general type as discussed above in connection with lower closure portion 32 are provided for the upper and lower surfaces of body portion 28. As seen from the cross-sectional view of FIGURE 3, the lower surface 92 of body portion 28 is provided with a plurality of concentric grooves of semi-circular cross-section surrounding the lower end of tunnel 38 in the same general manner in which grooves 78 and 80 in chamber 32 surround cavity 76 described above. Each of the stated three grooves in surface 92 contains a separate length of tubing with spaces 100 and 102 situated between the annular tubes as shown in FIGURE 3. Passages 104 and 106 connect with a third passage 108 and communicate spaces 100 and 102 with an external conduit 110 which may be connected to a vacuum pump (not shown) of conventional type such as mentioned hereinabove. The upper surface 112 of body portion 28 is provided with a plurality of relatively shallow grooves concentrically located with respect to the upper end of tunnel 38 and arranged generally in the manner described in connection with the similar grooves in surface 92 of body portion 28 except as noted below. Three separate annular tubes 114, 116 and 118 are positioned within the stated grooves in surface 112 whereby tubes 114 and 116 are relatively close together and tube 118 is displaced radially inwardly from the tube 116 whereby a space 120 is provided between tubes 116 and 118. A passage 122 communicates between space 120 and passage 108 previously described and located within body portion 28.

Figure 5:
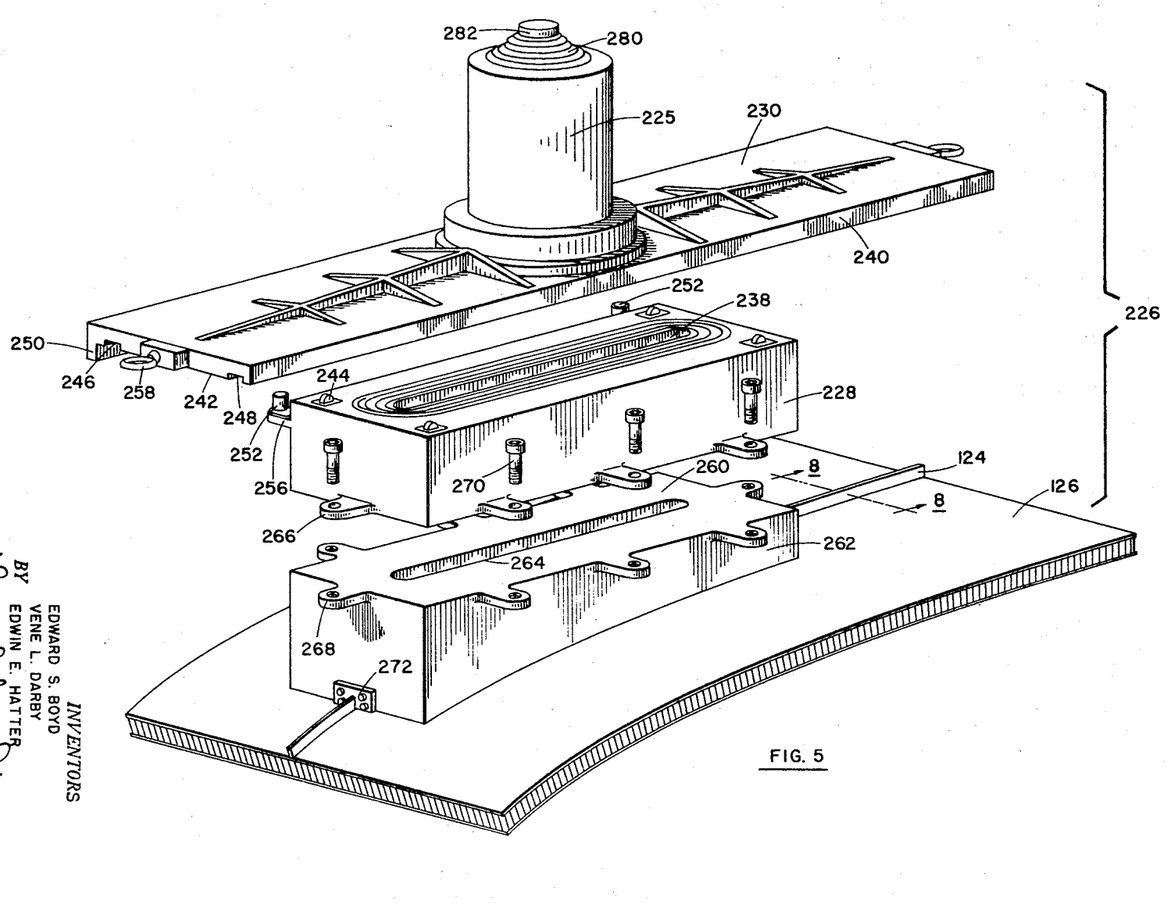
FIGURE 5 shows a general perspective view of another illustrative embodiment of apparatus somewhat similar to that shown in FIGURES 2, 3 and 4, adapted for use with curved workpieces and flange-like attachments secured thereto.

FIGURE 5 shows a modification of the apparatus discussed above in connection with FIGURES 2, 3 and 4, but embodying the same inventive principles as applied to joinder of an upstanding flange or brace 124 or the like to a lightweight panel of the type shown in FIGURE 1 but having non-planar external contour. Thus, portable chamber 226 corresponds generally to chamber 26 discussed above in connection with FIGURES 2, 3 and 4 whereby an electron beam source is mounted within housing 225 on upper closure or lid portion 230 for movement relative to block or body portion 228 in operative alignment with aperture or tunnel 238. Plate or base member 240 on upper lid portion 230 is provided with a substantially planar surface 242 having spaced apart grooves 246 and 248 therein for operative engagement with wheels or ball bearing members 244. Base member 240 is further provided with a flange 250 operatively adapted to engage rollers 252 and 254 supported on body portion 228 by means such as bracket 256. Drive means for causing movement of upper closure or lid portion 230 relative to body portion 228 may illustratively take the form of an external cable system or fluid operated cylinder (not shown) of conventional type secured at one or both ends of base member 240 by suitable means such as eye bolt or lug 258 shown in FIGURE 5. A plurality of annular seals corresponding generally to concentric tubes 114, 116 and 118 discussed above in connection with FIGURE 3 is provided on upper surface 212 of body portion 228, while sealing provisions similarly corresponding to tubes 94, 96 and 98 also discussed above are provided in the undersurface of body portion 228. Body portion 228 in the apparatus shown by FIGURE 5, instead of contacting the surface of workpiece 126 in the manner of portion 28 in the modification shown by FIGURES 2-4, contacts the upper surface 260 of an adapter 262. Adapter 262 is formed of suitable non-porous material, preferably of a moldable type such as fiber reinforced epoxy, and has its lower surface shaped to conform with the contour of workpiece 126. The lower surface of adapter 262 also incorporates sealing provisions such as described above in connection with annular tubes 94, 96 and 98 whereby sealing contact of adapter 262 with the surface of workpiece 126 is achieved. A tunnel 264 is provided through adapter 262 for alignment with tunnel 238 through body portion 228 whereby an electron beam originating within housing 225 may weld the workpiece components. Also, a plurality of lugs or attaching brackets 266 and 268 are formed on body portion 228 and adapter 262, respectively, each stated bracket having a hole therethrough whereby a plurality of bolts 270 may extend through the aligned brackets to secure members 228 and 262 in continuous and sealed operative relationship. Adapter 262 also incorporates sealing means at either end thereof adapted to prevent leakage of outside atmosphere into tunnel 264 around flange 124. The stated sealing means, indicated by reference numeral 272 in FIGURE 5 are described in detail below. A lower chamber such as member 32 shown, for example, in FIGURE 7, may be used in cooperation with the structure shown in FIGURE 5 where necessary or advantageous.

Figure 6:
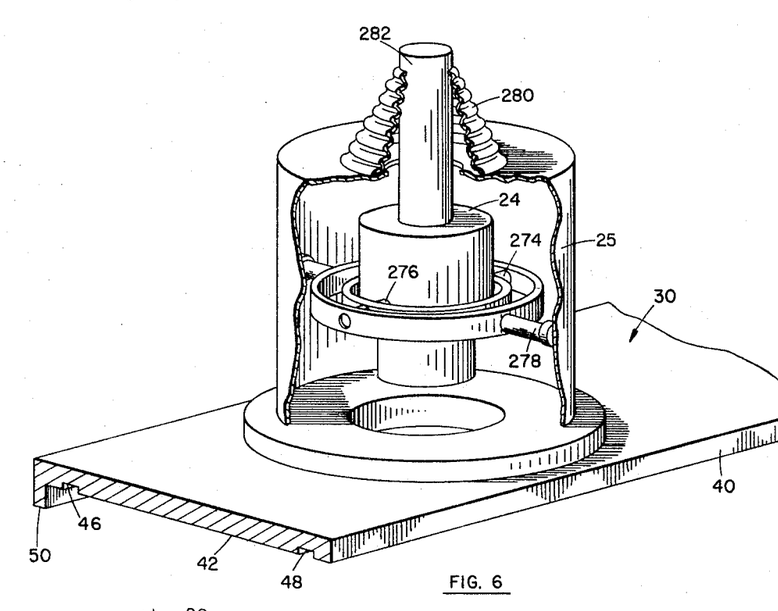
FIGURE 6 is an isolated view in perspective, partly broken away, of a portion of the apparatus shown in FIGURE 5.

FIGURE 6 shows illustratively a mounting arrangement for beam source 24 within a housing 25 for supporting source 24 on upper closure portion 30 in a manner permitting angular deflection of electron beam 22 by tilting movement of source 24 in addition to the linear movement of source 24 resulting from translation of closure member 30 relative to body portion 28 shown, for example, in FIGURE 3. The stated tilting movement of source 24 is permitted by a universal mount which may take the form of gimbal arrangement 274 shown in FIGURE 6. Gimbal 274 is of well known type incorporating pivot pins 276 and 278 having pivoting axes substantially at right angles to each other. Pin 278 may be welded or otherwise affixed to housing 25. Housing 25 is secured to plate or base member 40 of upper closure portion 30 in vacuum tight relationship and is movable therewith. Sealing means to prevent the entry of external atmosphere through housing 25 which would destroy the vacuum therein is provided in the form of flexible bellows 280. Bellows 280 is secured at one end to the top surface of housing 25 and at the other end to a shaft or column 282 affixed on electron beam source 24 and extending beyond housing 25 for attachment with suitable control mechanism (not shown) such as may be expedient for programming the movements of electron source 24 during its traversing movement relative to the workpiece.

An illustrative use of the apparatus shown in FIGURE 5 may be seen from FIGURE 8 which shows a flange or upstanding bracket 284 secured to one face sheet 288 of a lightweight panel such as shown, for example, in FIGURE 1. Flange 284 may have a base portion 286 relatively wider than the main portion of the flange. Electron beam 22 from source 24 may be tilted slightly away from the position directly over flange 284 whereby the beam contacts both base portion 286 and face sheet 288 continuously along a line resulting from linear movement of upper closure portion 30 with respect to body portion 228.

Figure 9:
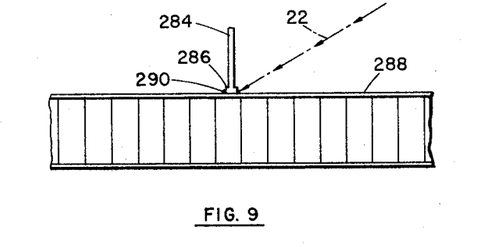
FIGURE 9 shows a cross-sectional view through another workpiece generally similar to that shown in FIGURE 8, but fabricated with slightly different apparatus.

A different approach to the problem of flange attachment to form a joint such as shown by FIGURE 8 is illustated in FIGURE 9 from which it may be seen that electron beam 22 is directed to the base of flange 284 at an angle considerably different from the angle of approach suggested in FIGURE 8. Apparatus for performing welding of various workpiece shapes and configurations including the joint shown in FIGURE 9 is illustratively shown in FIGURES 10, 11 and 12.

Figure 10:
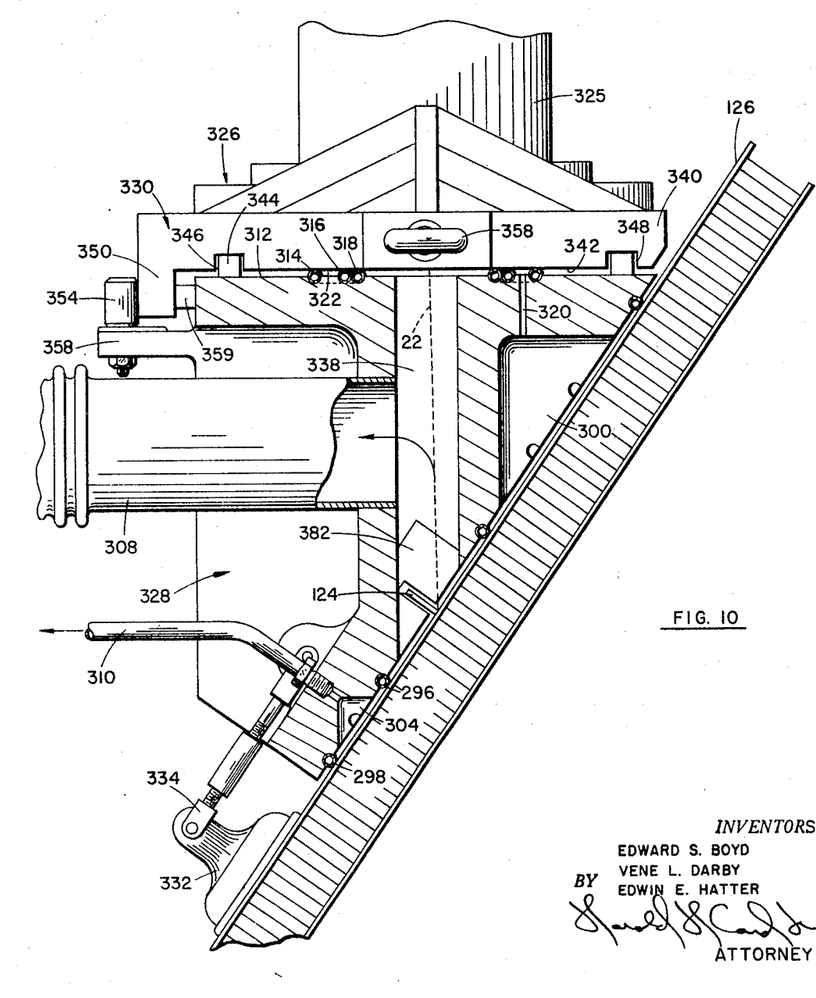
FIGURE 10 shows an elevational view, partly in cross-section, of a further illustrative embodiment of apparatus adapted to form the join shown in FIGURE 9.
Figures 11, 16:
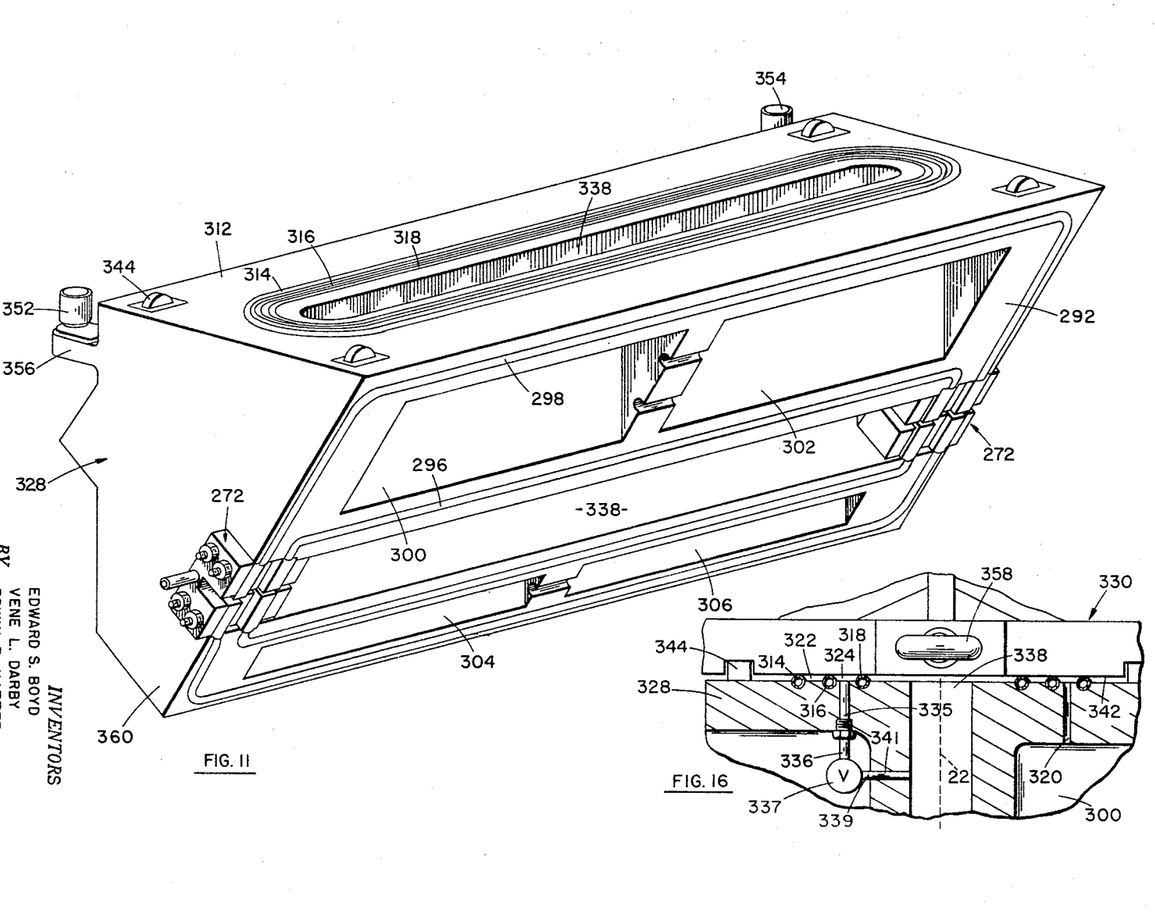
FIGURE 11 shows an isolated perspective view of a portion of the apparatus shown in FIGURE 10.
FIGURE 16 is an isolated cross-sectional view showing a detail of the sliding seal structure corresponding to the sealing arrangement of FIGURE 10.

The apparatus shown in FIGURE 10 embodies the same inventive principles as discussed above in connection with the modifications shown in FIGURES 2 through 6. Thus, portable chamber 326 corresponds generally to chamber 26 discussed above in regard to FIGURES 2-4 whereby an electron beam source is mounted within housing 325 on upper closure or lid portion 330 for movement relative to block or body portion 328 in operative alignment with aperature or tunnel 338. Plate or base member 340 on upper lid portion 330 is provided with a substantially planar surface 342 having spaced apart grooves 346 and 348 therein for operative engagement with wheels or ball bearing members 344. Base member 340 is further provided with a flange 350 operatively adapted to engage rollers 352 and 354 supported on body portion 328 by means such as bracket 356. Drive means for causing movement of upper closure or lid portion 330 relative to body portion 328 may illustratively take the form of an external cable system or fluid operative cylinder (not shown) of conventional type secured at one or both ends of base member 340 by suitable means such as eye bolt or lug 358 shown in FIGURE 10. A plurality of annular seals corresponding generally to concentric tubes 114, 116 and 118 discussed above in connection with FIGURE 3 is provided on upper surface 312 of body portion 328, as indicated by reference numerals 314, 316 and 318 in FIGURES 10 and 11. In addition, sealing provisions similarly corresponding to tubes 96 and 98 discussed above, are provided on the undersurface 292 of body portion 328 as indicated by reference numerals 296 and 298 in FIGURES 10 and 11. Surface 292 is adapted to contact a workpiece surface such as the substantially planar panel 126 indicated in FIGURE 10. Surface 292 as seen from FIGURE 11, is provided with a plurality of cavities as indicated by reference numerals 300, 302, 304 and 306, comprising two cavities on each side of tunnel 338. Each of the stated cavities is situated in the area between tubes 296 and 298 and each communicates with a vacuum pump by suitable means such as conduit 310 shown in FIGURE 10, whereby the cavities may be evacuated to produce a vacuum between sealing tubes 296 and 298 in essentially the same manner that spaces 88 and 100, for example, are evacuated as described in connection with the apparatus of FIGURE 3. Conduit 308 as shown in FIGURE 10 is provided for connection with a diffusion pump to evacuate tunnel 338 in the same manner discussed above for conduit 70 in the apparatus of FIGURE 3. Passage means are provided for causing a vacuum between sealing tubes 314 and 316 as shown by reference numeral 320 in FIGURE 10, whereby evacuation of cavity 300, for example, produces a vacuum in space 322 between the stated tubes.

Body portion 328, due to the relationship between surfaces 312 and 292, is adapted to direct electron beam 22 at an angle with respect to workpiece 126. Thus, while top surface 112 and undersurface 92 of body portion 28 in the apparatus shown by FIGURES 2 and 3 are substantially horizontal and parallel, it may be seen from FIGURE 10 that top surface 312 of body portion 328 is substantially horizontal but undersurface 292 is not parallel thereto and in fact intersects surface 312 at an included angle which may illustratively be 45°. The stated angle between surfaces 312 and 292 determines the angularity of electron beam 22 with respect to the surface of workpiece 126. In view of the stated angularity between portable chamber 326 and workpiece 126, holding means are provided for securing chamber 326 to the workpiece and adjustably positioning the chamber thereon until the evacuation of tunnel 338 produces sufficient holding force between the chamber and the workpiece. The stated holding means comprise a cup 232 which may be either of conventional magnetic or vacuum operated type and is adapted to be secured to the surface of metallic workpiece 126 as shown in FIGURE 10. A link 334 adjustable with regard to its length extends between cup 332 and portable chamber 326 and is pivotally connected at either end thereto.

Figure 12:
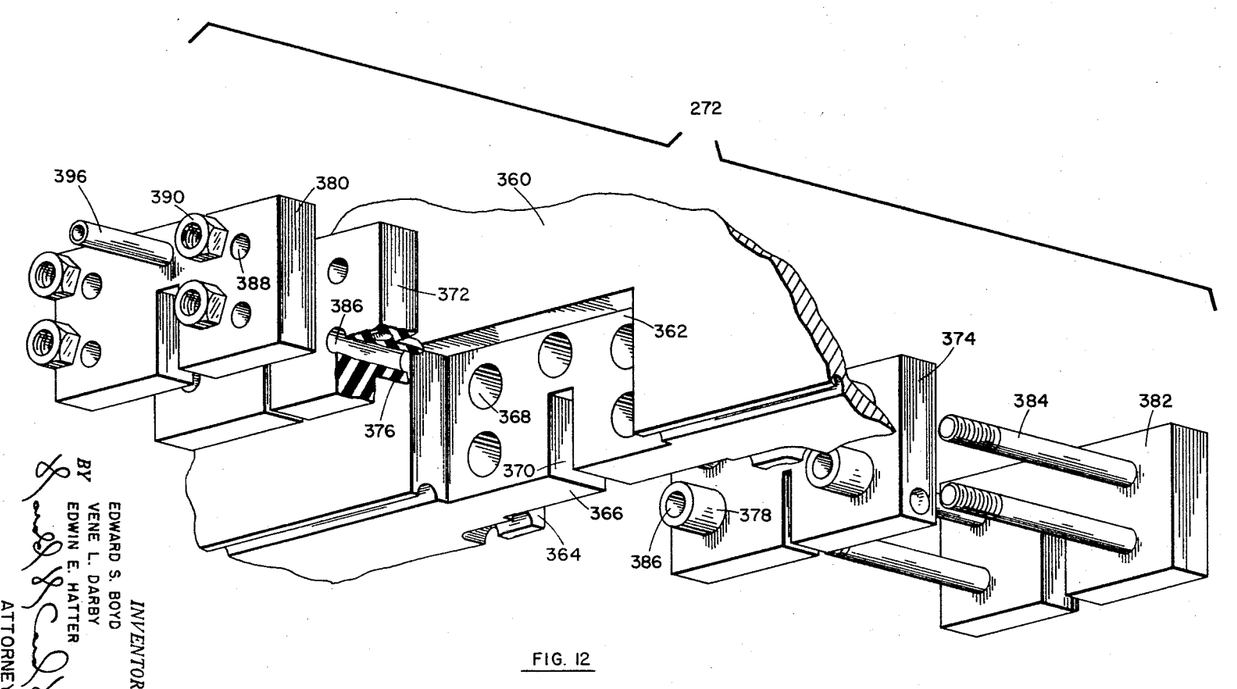
FIGURE 12 shows an isolated view, partly broken away, of a portion of the structure shown in FIGURE 11.

Due to the nature of the apparatus shown by FIGURES 10 and 11 with respect to its portability whereby the chamber may be moved from station to station along a single workpiece of considerable length, suitable end sealing provisions at each end of tunnel 338 are included where upstanding flange or bracket 284 contacts the chamber wall as at 360 in FIGURE 11 to insure that leakage of external atmosphere around the flange into tunnel 338 does not occur. The stated end sealing provisions are generally designated by reference numeral 272 in FIGURE 11 and are cooperatively related with tubes 296 and 298 discussed above. Since the end sealing means at either end of chamber 328 are substantially identical, only one end seal need be described. End seal 272 is shown in detail in FIGURE 12 from which it may be seen that the metallic wall 360 of body portion 328 is recessed inwardly on either side by a rectangular shaped cavity or depression 362 and 364, resulting in an intermediate web or wall portion of reduced thickness designated 366 substantially midway between cavities 362 and 364. A plurality of holes, one of which is designated at 368, is formed through web 366 as well as a slot 370 as shown in FIGURE 12. A pair of generally rectangular sealing elements of suitable resilient material sized to fit snugly within cavities 362 and 364 are shown in FIGURE 12, for example, and designated by reference numerals 372 and 374. The construction of elements 372 and 374 is substantially identical in each case, and includes a plurality of hollow protruding bosses such as indicated at 376 and 378 on members 372 and 374, respectively. Bosses 376, 378 are sized and located on members 372 and 374 to fit snugly within holes 368 from either end of the holes since the bosses are oppositely facing when members 372 and 374 are positioned in operative relationship within cavities 362 and 364. A pair of metal plates 380 and 382 are provided for holding sealing elements 372 and 374 in operative relationship and applying compressive force on the stated resilient element to cause sealing engagement of the same with contacting metal surfaces. Plate 382 is provided with four threaded studs as indicated at 384, each of which is affixed on plate 382 and sized to fit within holes 386 in bosses 376 and 378, while plate 380 has holes 388 sized and situated for penetration of studs 384 therethrough. Thus, with the component parts 372, 374, 380 and 382 of seal 272 assembled in operative relationship, studs 384 will extend through bosses 376, 378, and plate 380 and the threaded distal end of each stud 384 will protrude beyond the exposed surface of plate 380 whereby torque applied to holding nuts 390 will draw plates 380 and 382 toward each other, compressing members 372 and 374 therebetween.

Figure 13:
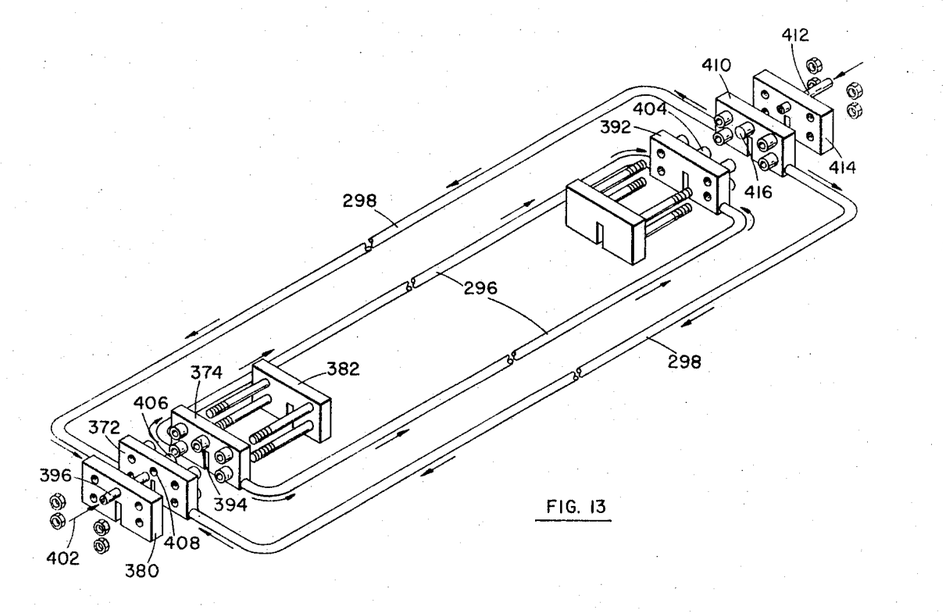
FIGURE 13 is a detailed view, in perspective, of the sealing means in the structure shown in FIGURES 11 and 12.
Figure 14:
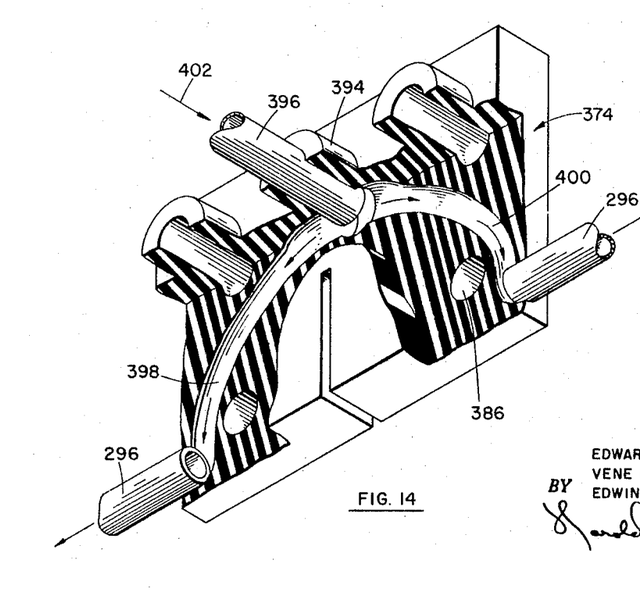
FIGURE 14 is an isolated perspective view, partly broken away, of a resilient end sealing element used in the sealing means shown in FIGURE 13.

Resilient end sealing elements 372 and 374 are operatively related to tubular seals 296 and 298 in a manner shown in greater detail in FIGURES 13 and 14. Referring to FIGURE 13, it may be seen that tube 296 is joined to member 374 and extends from either side thereof. Tube 296 is arranged on either side of tunnel 338 as shown in FIGURE 11 and is joined to resilient end sealing element 392 at the end of tunnel 338 opposite from the location of sealing element 374 as shown in FIGURE 13. As seen from FIGURE 14, a hollow boss 394 integrally formed on member 374 is sized and situated to receive and contain the end of a tubular conduit 396 secured to external plate 380 shown in FIGURE 13. An internal passage comprising two branches 398 and 400 is provided within resilient member 374 communicates between the ends of tube 296 and the interior of conduit 396 with the stated components assembled in operative relationship as shown by FIGURE 14. Thus, the introduction of fluid such as air under pressure through conduit 396 as indicated by arrow 402 in FIGURES 13 and 14 will result in the application of pressure from such fluid within tubes 296. Resilient element 392 is constructed substantially the same as element 374 except that boss 404 on element 392, instead of being hollow as in the case of boss 394 on member 374, is completely solid whereby a passage within member 392 extending between the adjoining ends of 296 on either side of member 392 merely communicates between the two tube ends but does not permit the escape of air pressure within the tubes from end seal 272. Thus, it will be understood by those skilled in the art that tube 296 may be pressurized internally by the application of air pressure through conduit 396 from an appropriate source (not shown). Boss 406 on member 372 shown in FIGURE 13 is hollow as indicated by hole 408 extending completely through member 372 and boss 406 whereby conduit 396 extends through member 372 and into boss 394 in the manner shown by FIGURE 14.

Resilient end sealing element 410 shown in FIGURE 13 is operatively related to tube 298 in substantially the same manner that element 374 is related to tube 296 as discussed above. Thus, conduit 412 mounted on external plate 414 is operatively adapted for one end thereof to communicate with a passage within element 410 corresponding to passage 398, 400 in element 374 described above, whereby air or other fluid under pressure may be introduced within tube 298 through conduit 412. boss 416 on element 410 is a solid member providing no means for entrance or escape of fluid from the passage within element 410. Resilient element 372 generally corresponds in function and purpose with resilient element 392 in that the passage within element 372 merely communicates the adjoining ends of tube 298 with each other but does not permit the entrance or escape of fluid under pressure from element 372.

Figure 15:
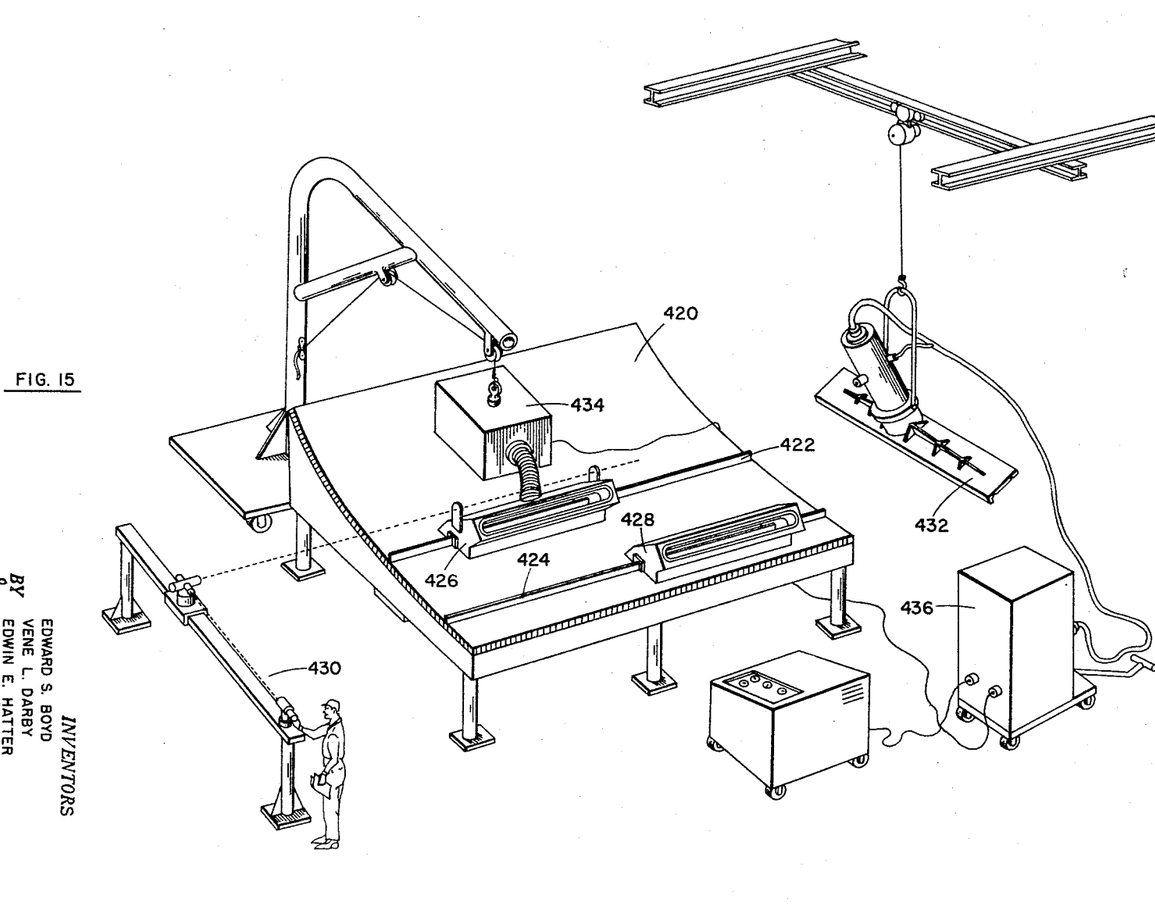
FIGURE 15 is a general perspective view of illustrative apparatus incorporating the inventive principles disclosed herein.

Referring to FIGURE 15, it may be seen that the inventive principles disclosed herein may be used to provide portable chambers for electron beam welding on workpieces of considerable size. For example, FIGURE 15 illustratively shows a lightweight steel panel 420 of honeycomb sandwich construction such as used in the fabrication of modern advanced supersonic and space vehicles. A typical problem in such fabrication involves attachment of braces or flanges as shown at 422 and 424 to panels of the stated type. One or more chambers 426 and 428 constructed and arranged in accordance with the teachings contained herein may be positioned as necessary for welding in the desired locations and properly aligned by suitable means such as the visual alignment system generally designated by reference numeral 430, the details of which form no significant part of the inventive concept disclosed herein. Chambers 426 and 428 include end seals corresponding to seals 272 shown, for example, in FIGURES 13 and 14, and are adapted to receive a slidable lid or upper closure member 432 in operative relationship therewith as discussed above in connection with lid portion 30 and 330. Means for creating a vacuum within chambers 426 and 428 may be provided as indicated at 434 and may comprise a diffusion pump operatively related to a mechanical vacuum pump as discussed above. A suitable source of power as shown by reference numeral 436 may be connected to an electron beam source as shown in FIGURE 15. Upon the completion of welding within a portable chamber such as chamber 426, for example, the chamber may be removed from panel workpiece 420 and relocated at the next welding station along brace or flange 422. Thus, by a series of separate overlapping welds individually accomplished at each position of chamber 426 along the entire length of the workpiece, brace or flange 422 may be attached to panel 420 throughout its length.

In connection with FIGURE 16, it may be seen that the inventive principles of the sliding seal provisions discussed above are incorporated in a seal configuration constituting a great improvement over known devices in the prior art. FIGURE 16 shows in further detail the improved seal arrangement which obviously may be used in any of the various vacuum chambers shown by FIGURES 3, 5, 10 and 11. As applied to the embodiment of FIGURE 10, FIGURE 16 illustratively shows body portion 328 with tunnel 338 formed therein and covered by upper closure or lid portion 330. Tubular seal elements 314, 316, and 318 are arranged generally as discussed hereinabove, with annular spaces 322 and 324 between the tubes as seen from FIGURE 16. In addition to the vacuum produced in space 322 by passage 320 communicating this space with cavity 300, a vacuum in space 324 is produced by interconnection of space 324 with tunnel 338 through passages 335, 341, conduits 336, 339, and valve 337. Thus, with valve 337 open, the same amount of vacuum necessary for welding in tunnel 338 which may be on the order of $10^{-3}$ inches Hg is created in space 324. After the stated high vacuum is initially established in space 324 and before welding is actually accomplished within tunnel 338, valve 337 may be closed to isolate space 324. Use of the stated structure and foregoing procedure has been found to produce continuous and very effective sealing between relatively movable components 328 and 330 during sliding movement of the latter item. This appears to be due primarily to the fact that relatively little or no differential pressure exists between space 324 and tunnel 338, hence there is little or no tendency for leakage past tube 318. The sealing provision thus disclosed is of paramount importance in achieving welding of the type accomplished by the invention in this case insofar as the translational movement of lid portion 330 is involved.

While the particular details set forth above and shown in the drawings are fully capable of attaining the objects and providing the advantages herein stated, the structure and method thus disclosed are merely illustrative and could be modified or varied to produce the same results without departing from the scope of the inventive concept as defined in the appended claims.

We claim:
1. Apparatus for welding on a workpiece, comprising:
   a chamber opened on one end, said open end having sealing means thereon for contacting a surface of said workpiece in sealed relationship therewith, so that said workpiece and said chamber in combination form an enclosure isolated from surrounding atmosphere,
   evacuating means operatively related to said chamber for evacuating said enclosure, and
   welding means including an electron beam source mounted on said chamber for applying welding heat to said workpiece while said enclosure is evacuated of atmosphere.
2. The structure set forth in claim 1 above including in addition thereto,
   universal joint means connected between said chamber and said electron beam source for permitting angular movement of said electron beam source relative to said chamber.
3. The structure set forth in claim 2 above wherein, said universal joint encompasses a gimbal mount.
4. The structure set forth in claim 1 above in which said chamber includes
   a movable closure portion forming a wall of said chamber,
   a stationary wall portion adapted to contact said workpiece surface, and
   mounting means for mounting said movable closure portion on said stationary wall portion for movement relative to said stationary wall portion.
5. The structure set forth in claim 4 above wherein, said closure portion comprises a platform slidably mounted on a first surface formed on said stationary wall portion of said chamber, said platform having a substantially planar surface adapted to contact said first surface,
   said mounting means for mounting said closure portion includes said first surface, said first surface being substantially planar, and
   second sealing means between said substantially planar surface on said platform and said first surface for continuous sealing of said chamber during movement of said platform relative to said chamber.
6. The structure set forth in claim 5 above, wherein said electron beam source is mounted on said platform.
7. The structure set forth in claim 6 above, wherein said means for evacuating said chamber comprises an oil diffusion vacuum pump.
8. The structure set forth in claim 6 above, wherein said second sealing means comprises a plurality of resilient tubes concentrically arranged on said first surface about the space enclosed by said chamber.
9. Apparatus for welding on a workpiece at a location substantially on a line of contact between two contacting components of said workpiece, one of said components comprising an upstanding flange-like projection to be joined in edgewise relationship to a surface of the other of said workpiece components, said apparatus comprising:
    an open ended wall chamber, said open end being adapted to contact said surface of said other workpiece component in sealed relationship therewith, said chamber walls encompassing a tunnel and forming together with said other workpiece component an enclosure isolated from surrounding atmosphere,
    sealing means on said chamber for sealing between said chamber and said workpiece components to form a pressure barrier between said tunnel and surrounding atmosphere,
    evacuating means operatively connected to said chamber for evacuating said tunnel, and
    welding means including an electron beam source mounted on said chamber for applying welding heat to said workpiece by passing said beam through said tunnel while said chamber is evacuated.

10. The structure set forth in claim 9 above wherein said sealing means includes at least one assembly mounted in a wall of said chamber near said open end and arranged to engage said one component in sealing relationship therewith where said one component extends through said wall of said chamber, said assembly including a deformable element adapted to grip said one workpiece component and forcibly to contact said other workpiece component, and said assembly further including pressure means for applying pressure to deform said element to cause said gripping and said forcible contact.

11. The structure set forth in claim 10 above in which said pressure means comprises a passage within said deformable element and conduit means communicating with said passage for permitting entrance of fluid under pressure within said conduit to fill said passage and expand said deformable elements due to internal pressure within said passage.

12. The structure set forth in claim 10 above wherein said pressure means comprises at least two oppositely facing relatively rigid surfaces between which said deformable element may be compressed upon application of force to draw said two surfaces toward each other, and
said pressure means further comprising means for applying force to draw said two surfaces toward each other.

13. The structure set forth in claim 11 above wherein said deformable element comprises a block of silicone rubber.

14. In a seal for a vacuum chamber adapted for use in welding on a workpiece, said chamber having at least one wall portion with an edge thereof adapted to contact a surface on said workpiece and to overlie an upstanding flange projecting substantially at a right angle from said workpiece surface:
    a block of deformable material mounted on said one wall portion in sealing relationship therewith and contiguous with said edge, said block having a slot on one edge thereof adapted to fit over said flange when said edge is in substantially uniformly contacting relationship with said workpiece surface, said edge of said wall portion being substantially coplanar with said slotted edge of said block, and
    pressure means for applying pressure to said block to expand said block against said flange and said surface in sealing relationship therewith.

15. The structure set forth in claim 14 above wherein said block is formed of silicone rubber.

16. Apparatus for welding on a workpiece surface, comprising:
    an open ended chamber formed by an encompassing wall portion surrounding a first tunnel, and an upper closure portion overlying said encompassing chamber wall at the end thereof opposite from said open end,
    adapter means for operatively relating said chamber to said workpiece surface, said adapter means having an encompassing wall surrounding a second tunnel, said encompassing wall of said adapter means being arranged to contact said open end of said chamber and thereby align said second tunnel with said first tunnel, said encompassing wall of said adapter means further including a workpiece engaging contoured surface oppositely corresponding to the contour of said workpiece surface, said adapter means contoured surface further having sealing means for contacting said workpiece surface in sealed relationship therewith,
    evacuating means operatively related to said chamber and said adapter means for evacuating said first and second tunnels, and
    welding means including an electron beam source mounted on said chamber for applying welding heat to said workpiece by passing said electron beam through said first and second tunnels.

17. Apparatus for welding on a workpiece surface, comprising:
    a chamber having sides formed by an encompassing wall portion surrounding a tunnel,
    said chamber also having a first surface, said first surface having sealing means thereon for contacting said workpiece surface in sealing relationship therewith whereby said tunnel communicates with said workpiece,
    said chamber also having a closure portion overlying said tunnel and contacting a second surface on said chamber,
    said wall portion extending between said first and said second chamber surfaces,
    evacuating means operatively related to said chamber for evacuating said tunnel,
    welding means including an electron beam source mounted on said chamber for applying welding heat to said workpiece by passing said beam through said tunnel while said chamber is evacuated of atmosphere,
    said first chamber surface being at an angle with respect to said second chamber surface so that said beam is directed at an oblique angle relative to said workpiece surface.

18. The structure set forth in claim 17 above wherein:
said second surface of said chamber is substantially planar,
said closure portion generally comprises a platform having a substantially planar surface in contiguous relationship with said second surface of said chamber, said closure portion being adapted for sliding movement relative to said second surface of said chamber,
drive means connected to said closure portion for causing said sliding movement, and
second sealing means between said second surface on said platform and said second surface on said chamber for continuous sealing therebetween during said sliding movement.

19. The structure set forth in claim 18 above wherein:
said second sealing means comprises a plurality of spaced apart resilient tubes arranged concentrically about said tunnel opening in said second surface of said chamber so that a space exists between said tubes, and
said second sealing means also comprises vacuum pump means communicating with said space between said spaced apart tubes for evacuating said space.

20. Apparatus for welding on a panel-like workpiece portion having at least two spaced apart oppositely facing surfaces comprising a first surface and a second surface, said apparatus comprising:
    an open ended first chamber having sides encompassing a tunnel, said open end being adapted to contact said first workpiece surface in sealed relationship therewith, said first chamber having a closure portion overlying said sides and contacting same in sealed relationship therewith, a second chamber having a surface of oppositely corresponding curvature relative to said second workpiece surface and adapted to contact said second workpiece surface in sealing relationship therewith, said second chamber surface having a cavity therein for alignment with said tunnel on the opposite side of said workpiece therefrom, first sealing means between said first chamber open end and said first workpiece surface for sealing therebetween, second sealing means between said second chamber surface and said second workpiece surface, evacuating means operatively related to said first and second chambers for evacuating said tunnel and said cavity, and welding means including an electron beam source mounted on said first chamber for applying welding heat to said workpiece by passing said beam through said tunnel while said tunnel and said cavity are evacuated.

21. The structure set forth in claim 20 above wherein:
said closure portion is adapted for sliding movement relative to said first chamber sides, and further including drive means connected to said closure portion for causing said sliding movement, said electron beam source being mounted on said closure portion whereby said sliding movement of said closure portion causes movement of said beam along a welding path on said workpiece portion.

22. The method of welding a panel-like workpiece portion having at least two spaced-apart oppositely facing surfaces comprising a first surface and a second surface such method comprising:
placing a first chamber against said first surface so that said workpiece portion forms a wall of said first chamber, placing a second chamber against said second surface so that said workpiece portion forms a wall of said second chamber, said second chamber being aligned with said first chamber, sealing said workpiece from outside surrounding atmosphere so that said workpiece portion is subjected to a high vacuum within said first and second chambers, and directing an electron beam upon said workpiece portion within said vacuum to weld simultaneously on both said first and second surfaces.

23. In a vacuum chamber for electron beam welding;
a plurality of walls forming an enclosed area within which a vacuum may be established, means for mounting one of said walls for translational movement of said one wall with respect to the remainder of said walls, said one wall having a substantially planar surface translationally movable with said one wall, a stationary surface formed by said remaining walls adapted to confront said movable substantially planar surface, said enclosed area forming an opening in said stationary surface, sealing means between said movable and said stationary surfaces for continuous sealing therebetween during said relative translational movement, said sealing means comprising a plurality of annular spaced-apart tubes arranged concentrically between said movable and said stationary surfaces with said opening generally centered within said concentricity, and means for evacuating the space between at least two of said spaced-apart tubes to produce a differential pressure across one of said tubes relatively lower than the pressure differential existing between said enclosed area and outer surrounding atmosphere.

24. The structure set forth in claim 23 above wherein said means for evacuating said space between said tubes comprises conduit means interconnecting said space and said enclosed area.

25. The structure set forth in claim 24 above wherein said conduit means includes a valve selectively operable to permit said interconnection between said space and said enclosed area and to prevent said interconnection.

26. In a vacuum chamber for electron beam welding:
a plurality of walls forming an enclosed area within which a vacuum may be established, means for mounting one of said walls for translational movement of said one wall with respect to the remainder of said walls, said one wall having a substantially planar surface translationally movable with said one wall, a stationary surface formed by said remaining walls adapted to confront said movable substantially planar surface, said enclosed area forming an opening in said stationary surface, sealing means between said movable and said stationary surfaces for continuous sealing therebetween during said relative translational movement, said sealing means comprising a plurality of annular spaced-apart tubes arranged concentrically between said movable and said stationary surfaces with said opening generally centered within said concentricity, first means for evacuating the space between a first pair of said annular spaced-apart tubes, second means for evacuating the space between a second pair of said annular spaced-apart tubes.

27. The structure set forth in claim 26 above wherein:
said space between said first pair of tubes is concentrically within said space between said second pair of tubes, and said first means comprises conduit means interconnecting said space between said first pair of tubes and said enclosed area.

28. Apparatus for working materials with a beam of charged particles comprising:
means for creating a low pressure environment about at least a region of a material to be worked, said means having an opening in the top thereof;

means for generating an intense beam of charged particles;

means movably supporting said beam generating means exterior of and aligned with a portion of the opening in the top of said low pressure environment creating means so that the beam of charged particles produced by said beam generating means may pass through the opening and impinge upon a material to be worked said supporting means being in sealed relationship with said beam generating means and extending therefrom a distance at least equal to the desired range of movement of the beam generating means whereby the portions of said opening not under said beam generating means are covered by said supporting means regardless of the position of the beam generating means; and means positioned between said supporting means and the top of said low pressure environment creating means for providing an air tight sliding seal around said opening.

29. Apparatus for working materials with a beam of charged particles comprising:
means for creating a low pressure environment about at least a region of a material to be worked, said means having an elongated slot in the top thereof;

means for generating an intense beam of charged particles;

means movably supporting said beam generating means exterior of and aligned with a portion of the slot in said low pressure environment creating means so that the beam of charged particles from said beam generating means may pass through the slot and impinge on a material to be worked, said supporting means being in sealed relationship with said beam generating means and extending over said slot in both directions from the beam generating means a distance substantially equal to the length of the slot whereby the length of the slot not directly under the beam generating means is covered by said supporting means regardless of the position along the slot of the beam generating means; and means positioned between said supporting means and the top of said low pressure environment creating means for providing an air tight sliding seal around the slot.

30. The apparatus of claim 29 wherein the supporting means comprises:

an apertured elongated plate having said beam generating means sealably mounted thereon in alignment with the aperture therein.

31. The apparatus of claim 30 wherein the means providing a sliding seal comprises:

a seal mounted on the top of said low pressure environment creating means and extending completely around the slot, said seal being adapted to be squeezed between said top and said elongated plate to thereby provide an air tight seal across which the plate may be caused to slide.

References Cited by the Examiner

UNITED STATES PATENTS

| | | | |
|---|---|---|---|
| 1,413,996 | 4/1922 | Sanborn et al. | 219—72 X |
| 1,665,360 | 4/1928 | Hawley. | |
| 2,053,417 | 9/1936 | Brace | 219—72 |
| 2,987,610 | 6/1961 | Steigerwald | 219—117 |
| 3,003,601 | 10/1961 | Ott. | |
| 3,016,449 | 1/1962 | Steigerwald | 219—117 |
| 3,136,883 | 6/1964 | Radtke | 219—117 X |

JOSEPH V. TRUHE, *Primary Examiner.*

ROBERT W. COOKE, RICHARD M. WOOD,
*Examiners.*